United States Patent
Kahkoska

(12)
(10) Patent No.: US 6,629,269 B1
(45) Date of Patent: Sep. 30, 2003

(54) APPARATUS AND METHOD FOR TROUBLE-SHOOTING DESKTOP CONNECTIVITY PROBLEMS

(75) Inventor: James A. Kahkoska, Colorado Springs, CO (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 09/360,190

(22) Filed: Jul. 23, 1999

(51) Int. Cl.[7] .................................................. H02H 3/05
(52) U.S. Cl. ....................................................... 714/43
(58) Field of Search ............................... 714/43, 44, 56, 714/40, 25; 709/227, 228, 221

(56) References Cited

U.S. PATENT DOCUMENTS

| | | | | |
|---|---|---|---|---|
| 4,518,958 A | * | 5/1985 | Cook et al. .................. | 340/679 |
| 5,270,658 A | * | 12/1993 | Epstein ........................ | 324/424 |
| 5,577,198 A | * | 11/1996 | Willrett et al. ................ | 714/33 |
| 5,583,874 A | * | 12/1996 | Smith et al. ................. | 714/712 |
| 5,892,926 A | * | 4/1999 | Witkowski et al. ......... | 710/100 |
| 5,923,663 A | * | 7/1999 | Bontemps et al. .......... | 370/445 |
| 6,175,865 B1 | * | 1/2001 | Dove et al. .................. | 709/220 |

\* cited by examiner

*Primary Examiner*—Dieu-Minh Le
(74) *Attorney, Agent, or Firm*—Dellett and Walters

(57) ABSTRACT

A network/cable test instrument provides expert advice to a user to assist in diagnosing configuration and cabling issues with connections to a network. The device attaches inline between two devices or cables and provides graphic representation of the configuration in which it is installed.

17 Claims, 6 Drawing Sheets

APPARATUS AND METHOD FOR TROUBLE-SHOOTING DESKTOP CONNECTIVITY PROBLEMS

BACKGROUND OF THE INVENTION

This invention relates to computer networks and more particularly to a hand-held computer network testing apparatus and method for trouble-shooting network connectivity problems.

Heretofore, network test instruments have connected to a network under test by attaching to the network as a node or station thereon. A network typically consisted of a hub, with all stations connected to that hub. Traffic from all stations on the network was visible at any connection point to the hub. For example, in the case of an Ethernet system, all data traffic is sent over the network such that all the data passes by a given node on a particular segment of the network. The prior test instrument typically becomes a station on the network and observes all data packets passing by on the network. Various errors are thereby detected, network usage and other such statistics are gathered, to attempt to trouble-shoot connectivity problems.

However, with the advent of switched networks, connection of a test instrument as a node on the network provides less useful data. The only information that a given station will receive on such a switched network is broadcast data frames and frames addressed to the specific node to which the test instrument is attached. Further, all the data received by the node is likely to be error free, as the data switch will not pass frames with errors on. All the data frames coming from the switch will be good frames. Trouble-shooting the network then becomes more difficult.

There are many situations that can cause problems to occur in a typical networked office environment. For example, a network cable may be damaged by being stepped on or by being repeatedly run over by the wheels of a chair. Typical RJ45 connectors used for network connections are the same configuration, size and shape as telephone jack connectors. The similarity can result in a network cable being connected to a telephone jack by mistake, for example. Further, an individual computer that is connected to a network can be mis-configured. Selection of an improper item in a configuration menu, for example in a Windows check box, can result in degraded performance or complete failure of a PC to communicate with a network. Trouble-shooting such situations can be difficult, especially since the level of skill required for a network technician to handle such matters is high. As the number of highly skilled network technicians is low relative to demand, the degree of understanding of network operation required by a typical network test instrument may be higher than a typical person who has the task of maintaining a network.

SUMMARY OF THE INVENTION

In accordance with the invention, a hand held network test instrument is adapted to be positioned inline between a PC and the network. The instrument thereby analyzes and reports the configuration and status of the PC and the network connection.

Accordingly, it is an object of the present invention to provide an improved network test instrument that is adapted to operate inline between a PC NIC and a network.

It is a further object of the present invention to provide an improved network test instrument that determines and reports link pulse configuration problems and cabling problems.

It is yet another object of the present invention to provide an improved network test instrument that senses misconfigured link pulse cables and corrects such misconfigurations.

It is a further object of the present invention to provide an improved network test instrument that identifies the type of service to which it is connected.

Another object of the present invention is to provide an improved network test instrument for measuring network health.

Still a further object of the present invention is to provide an improved network test instrument that operates as an expert system to trouble shoot networks and cables and to advise technicians of problems regarding network conditions.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a hand-held network test instrument. The instrument is adapted for insertion inline between a network and a device hooked to the network. Various tests and inquiries are made by the instrument and reported to a user, in a manner to enable even a user relatively unfamiliar with the inner workings of a network to trouble-shoot the network and the devices hooked thereto.

Figure 1:
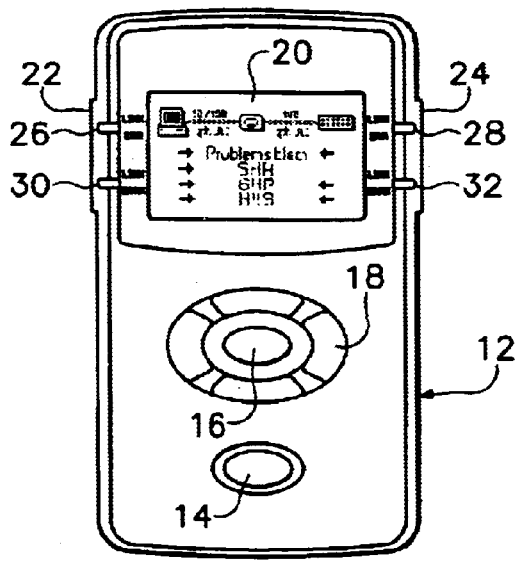
FIG. 1 is an exemplary view of a hand-held network test instrument according to the invention.

Referring to FIG. 1, a view of a hand-held network test instrument 10 according to the invention, the test instrument comprises a somewhat rectangular case 12, with a power switch 14 positioned near a lower end of the case, centered with respect to left and right sides of the case. Positioned above power switch 14 is a select key 16 centered within a "ring" of navigation keys 18. In the preferred embodiment, there are 4 navigation keys, to provide leftward, rightward, upward and downward navigation functionality. All of the above mentioned keys and switches are located below the top-to-bottom center line of the case. Above the center line is a display 20, suitably a backlit LCD display. Left and right connectors 22 and 24 are provided at left and right sides of the case, suitably comprising RJ45 female connectors, to interface to a personal computer (PC) and the network, for example, via connection with cables having corresponding male RJ45 connectors. The top ⅓ of display 20 is suitably aligned with the left and right connectors, to provide a physical association with the information displayed thereon and the two connectors 22, 24. An enhanced graphic sensation of the inline aspect of the device is thereby provided to the user.

At the left and right edges of the test instrument case, adjacent the connectors 22, 24, are provided link/collision/error indicators 26, 28. Immediately therebelow are positioned left and right utilization indicators 30, 32. Suitably, indicators 26, 28, 30 and 32 comprise tri-color LEDs, indicators 26 and 28 representing link (green), collisions (yellow) and errors (red). Indicators 30 and 32 suitably represent utilization. In the preferred embodiment, indicators 30 and 32 are driven green to show a utilization of less than 40%, yellow to represent a utilization of 40% to 70%, and red to show utilization over 70%.

Figure 2:
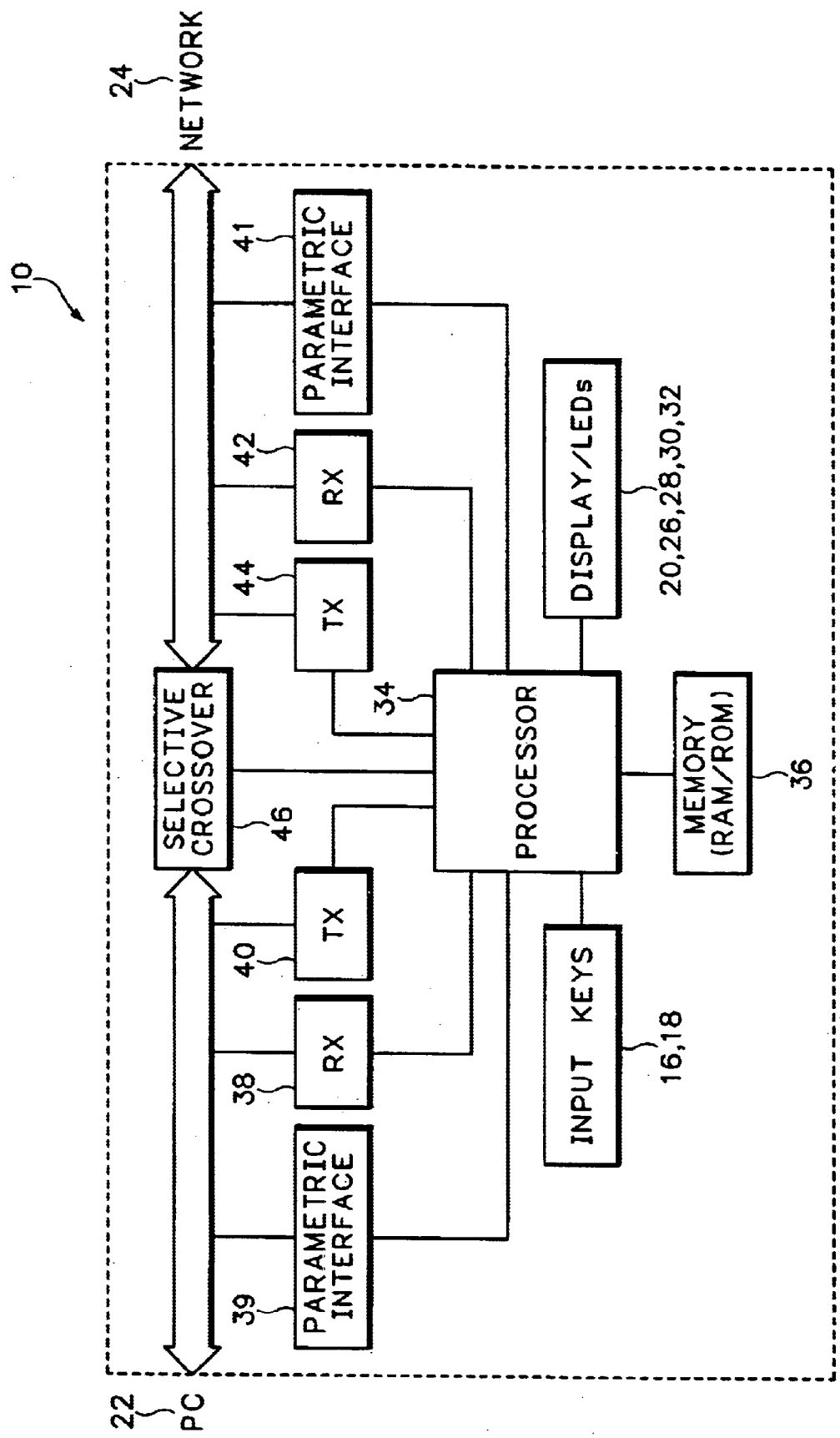
FIG. 2 is a block diagram of a hand-held network test instrument according to the invention.

Referring now to FIG. 2, a block diagram of the test instrument in accordance with the invention, the instrument 10 includes a processor 34 for driving operation thereof and memory 36, which can include RAM, ROM, PROM, etc. Input keys 16 and 18 interface to the processor, for interpretation of actuation of the various keys. Processor 34 may suitably comprise hardware, software, or combinations thereof. Display 20 and indicators 26, 28, 30 and 32 are also suitably driven by the processor. Connector 22, which is designated as the PC side in the illustrated embodiment provides a bi-directional interface into the instrument. A first receiver 38, a first parametric interface 39 and a first transmitter 40 interface between the processor and the PC side connector 22. Second parametric interface 41, second receiver 42 and second transmitter 44 connect between the processor and the connector 24, designated the network side in the present embodiment. Data appearing on either side of the instrument at connector 22 or connector 24 is passed through to the other connector, via selective crossover block 46, which is controlled by processor 34.

In operation, data is received independently by receivers 38 and 42, for analysis to observe both the PC side and the Network side of data traffic. Transmitters 40 and 44 are suitably able to send data to the respective connector, for communication with the PC or the Network. The parametric interfaces 39, 41 read voltages, impedances, apply voltages, etc. for access to network conditions at a physical layer. Selective crossover 46 is a crossover network that is controllable by the processor, to re-map input to output. This feature is useful in connection with link error detection and compensation functions performed by the instrument as discussed hereinbelow.

Figure 5:
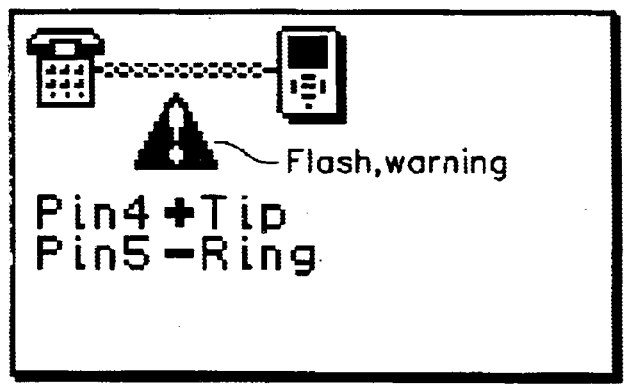
FIG. 5 is a representative display when a telephone service is detected by the instrument.
Figure 3:
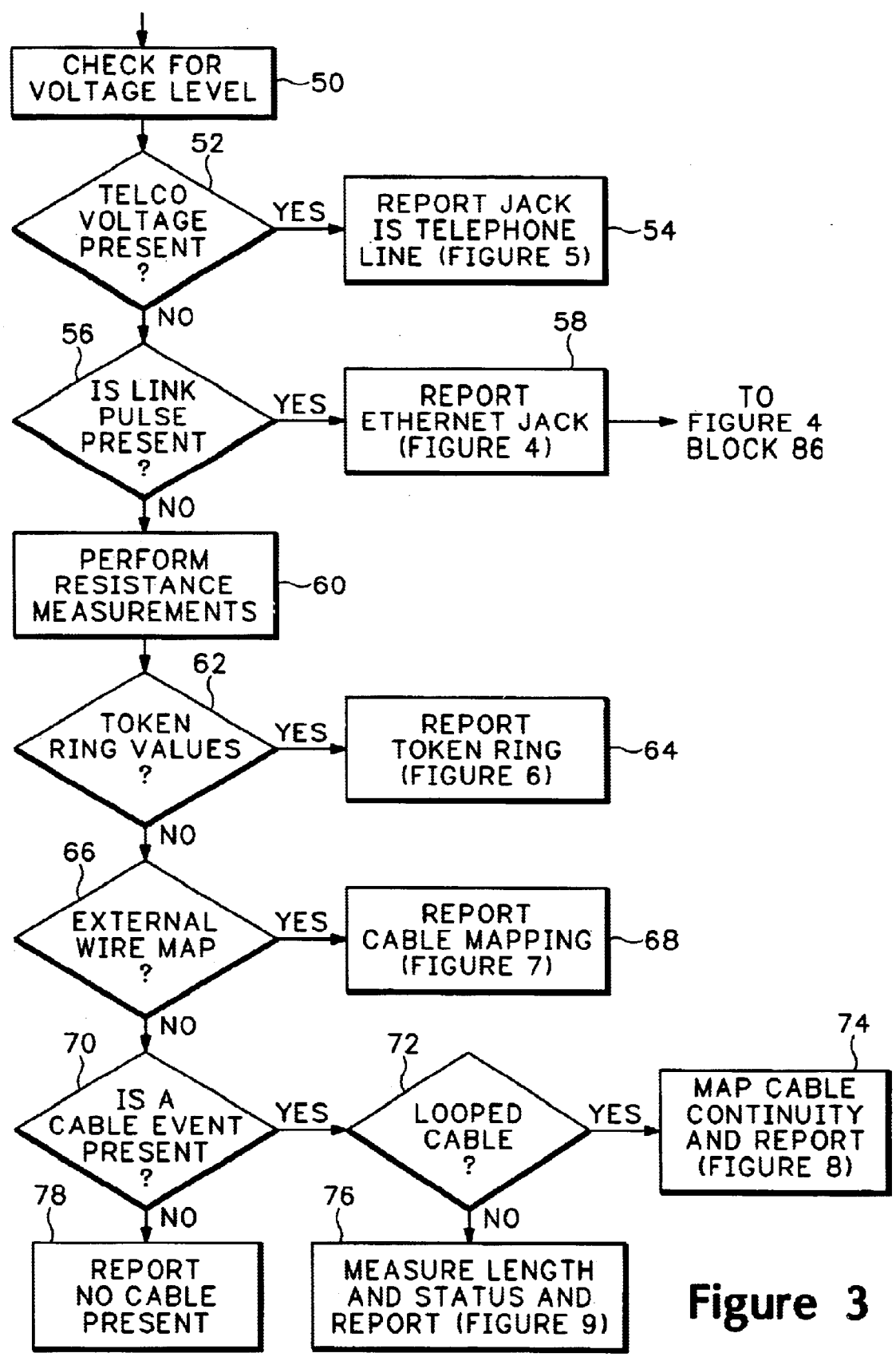
FIG. 3 is a flow chart of the service identification steps performed in accordance with the present invention.

Referring now to FIG. 3, in use, the instrument is typically connected inline between a PC and a Network. On startup, a service identification process is typically selected and performed. Since the preferred instrument includes two RJ45 connectors, the service identification process is done on both connectors, to determine what type of service each connector is attached to. First, in step 50, a voltage level measurement is made at the particular connector. If a telephone service level voltage (say for example, greater than 9 volts) is present (decision 52), then step 54 reports this information to the user (suitably on display 20). The pins of the connector that have tip and ring will also be reported. A warning message may also be generated, since one would not normally want to attach a network interface to a telephone service jack. An exemplary display is shown in FIG. 5, wherein an exclamation mark within a triangle is flashed to denote a warning condition. Icons representing a telephone and the instrument 10 itself, with the cable connected therebetween are also displayed, to visually convey the configuration.

Figure 6:
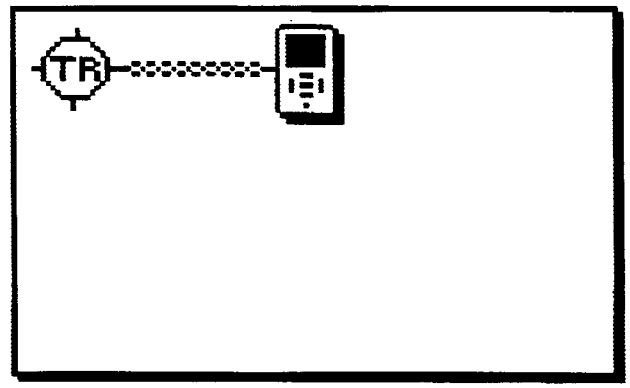
FIG. 6 is a representative display when a token ring is detected by the instrument.
Figure 7:
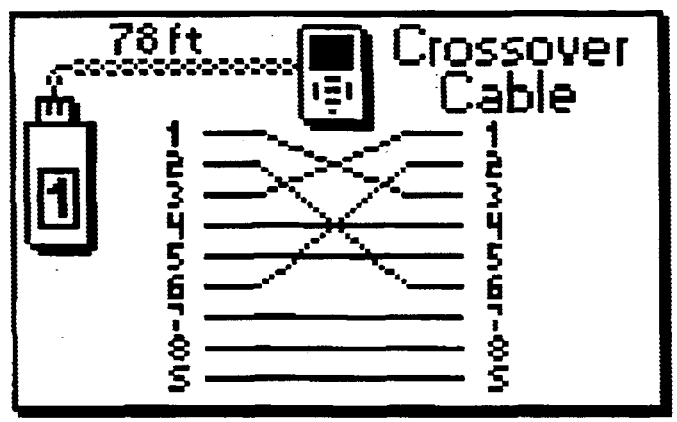
FIG. 7 is a representative display when a external wire map condition is detected by the instrument.

If in block 52 no telephone voltages are present, then a check is made for link pulse in block 56. If link pulse is detected, then this is reported (block 58) and further operations are performed as discussed in conjunction with FIG. 4 hereinbelow. If no link pulse was found in block 56, then resistance measurements are made (block 60). Decision block 62 determines whether the resistance measurements represent values indicative of a Token Ring being connected to the instrument. If a Token Ring is connected, then it is reported (block 64), suitably by displaying an appropriate graphic or other message on display 20 as illustrated in FIG. 6. If no token ring is detected, then decision block 66 examines whether external wire map values were measured. In accordance with this determination, an adapter is suitably attached at a distal end of the particular cable under test. The adapter provides a matrix of various resistance values across the wires of the cable, such that the wiring configuration is uniquely determinable. The configuration is then reported in block 68. Shorts and opens are also indicated. FIG. 7 is illustrative of a typical report, wherein the cable length is also determined and shown, the wiring configuration is graphically displayed, and the existence of the wiring matrix is indicated by the box with the numeral 1 therein (in this particular display).

Figure 8:
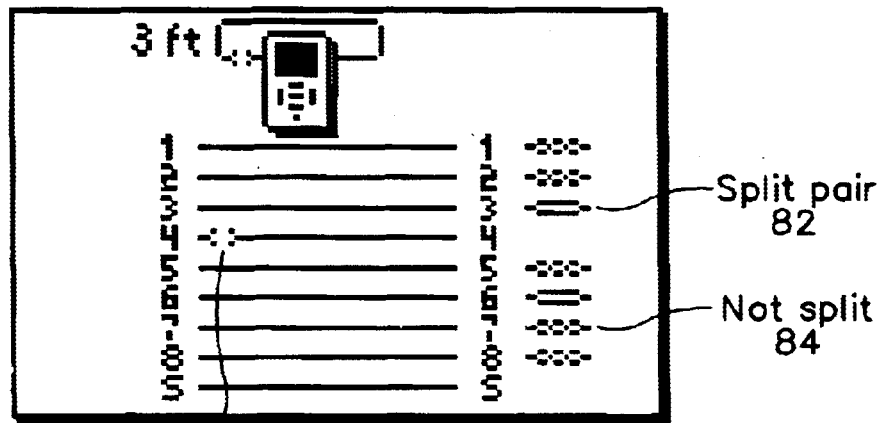
FIG. 8 is a representative display when a looped cable is detected by the instrument.

If an external wire map configuration is not detected in block 66, then decision block 70 checks whether a cable is even present. If so, and it is a looped cable (decision block 72), then the cable configuration is mapped, the cable length is tested and its continuity is determined and reported (block 74) as in FIG. 8, for example. In FIG. 8, the representative cable is 3 feet long. An open exists in the particular cable on pin 4, and is indicated by flashing region 80. The length is measured from both sides of the instrument, so that the position of the open may be indicated graphically, to enable the user to pin-point its location, ideally to cut the cable at that position and attach a new RJ45 connector, for example. Split pairs are indicated by graphic 82, representing parallel cables, while pairs that are not split are represented by graphics 84 which resemble twisted cable pairs.

Figure 9:
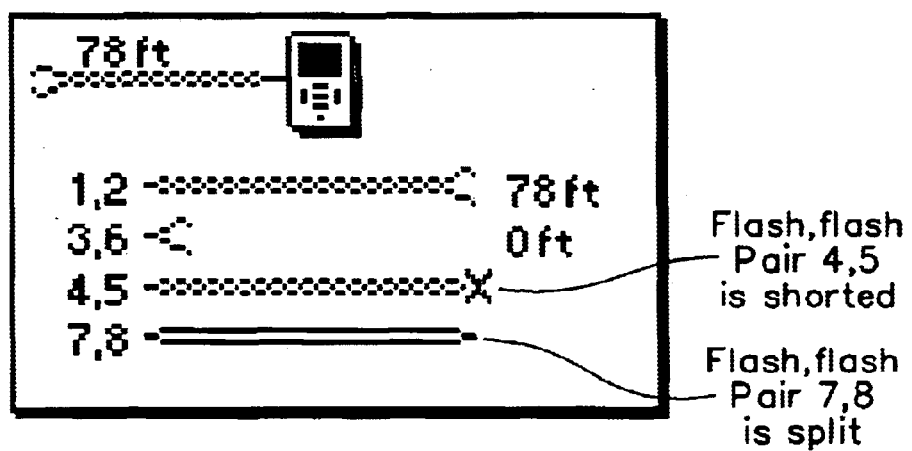
FIG. 9 is a representative display when an unterminated cable is detected by the instrument.

If a cable is present and it is not looped or 30 otherwise terminated, its length is measured and the status is reported (opens, shorts, splits) in block 76. FIG. 9 is a report display showing many of the possible items that can be displayed, wherein the cable is shown as 78 feet (pair 1,2 is 78 feet), pair 3,6 is absent (0 feet), pair 4,5 are shorted, represented by a flashing X at one end of the cable graphic and pair 7,8 is split. The wire indicator for pair 7,8 is flashed, to bring attention to the split condition. In actual test situations, not all of these items will necessarily be displayed concurrently, as the problem set of a give situation may not match the problem set illustrated in FIG. 9.

If no cable is present, this is noted in block 78 and the instrument continues to check for attachment of a cable.

Length determinations are suitably made by TDR techniques or other length determination procedures not within the scope of this disclosure.

Figure 4:
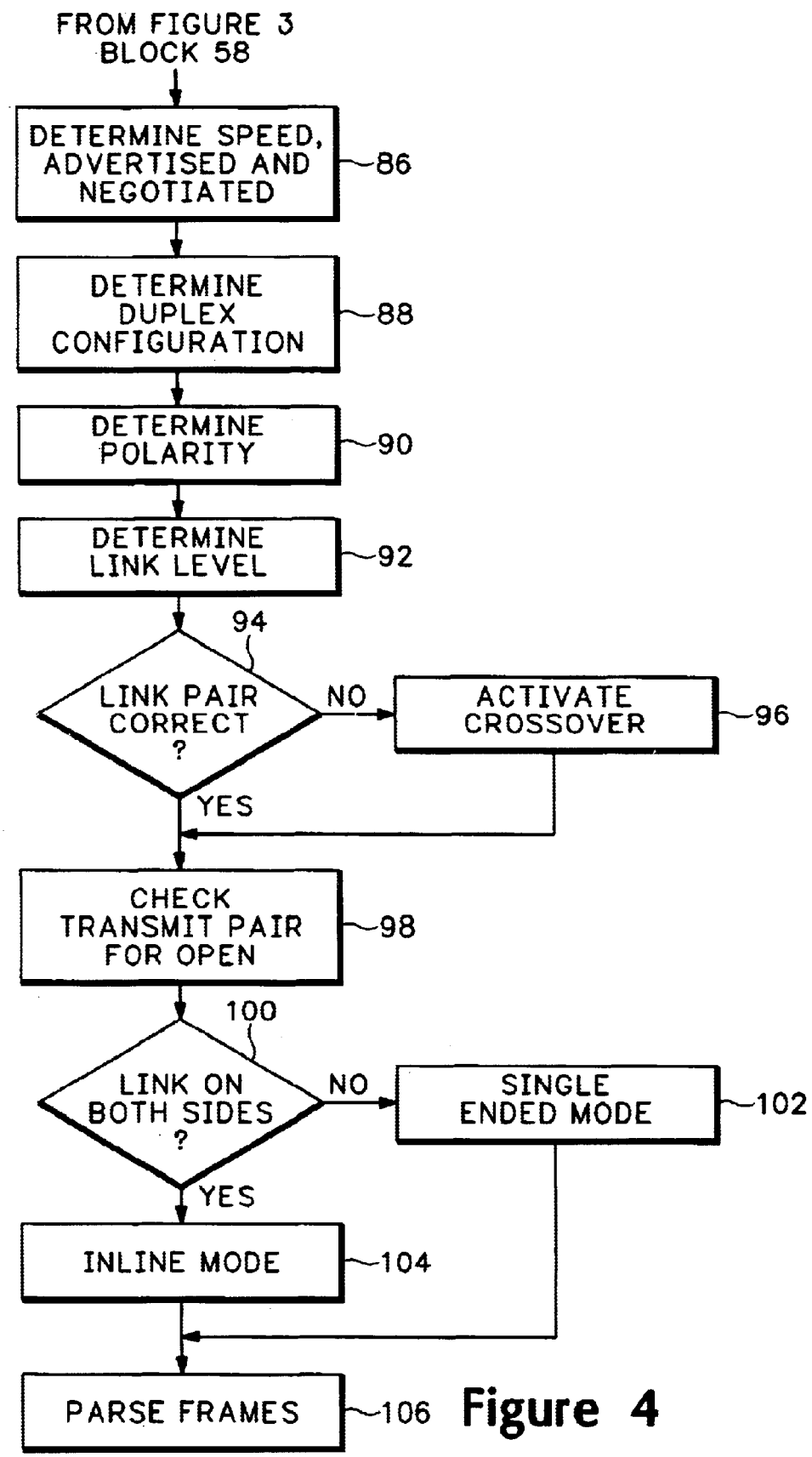
FIG. 4 is a flow chart of steps performed when link pulse is present and detected.

Referring now to FIG. 4, which is a flow chart of steps performed when link pulse is present and detected in block 58 of FIG. 3, step 86 is performed to determine the advertised network speed. In step 88, the advertised duplex configuration is determined, polarity is determined and the signal level of the link is determined (steps 90, 92). Now, a determination is made whether the link is on the correct pair (decision block 94). If not, the step 96 is performed, to activate the selective crossover 46 (FIG. 2) so that the link pair error is corrected. This correction step enables the trouble-shooting to continue, so that other potential issues may be resolved even before a corrective cabling operation is done.

Whether step 96 is performed or not, in block 98, the transmit pair is checked to see if an open exists.

Figure 11:
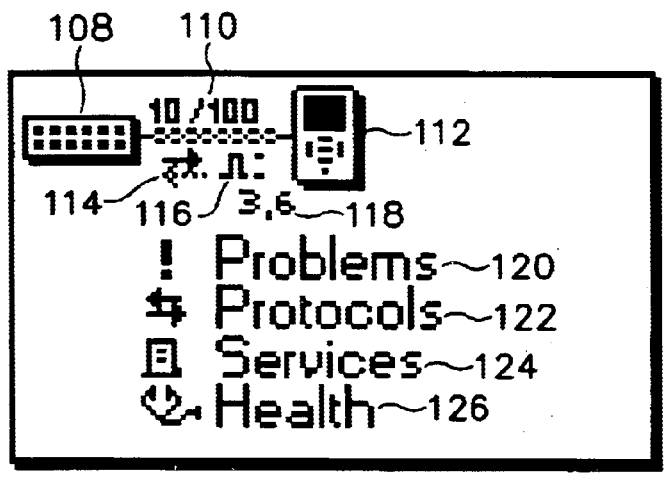
FIG. 11 is a representative display when the instrument operates in a single-ended mode.

If link was not detected on both sides of the instrument (decision block 100) then the instrument is operated in a single ended mode (block 102). A suitable display for this mode is illustrated in FIG. 11. In FIG. 11 a network node or switch is indicated by icon 108, the network speed is 10/100 (icon 110), the test instrument is represented by icon 112, the network is half-duplex (icon 114), the link is normal level, normal polarity (icon 116) and is on pair 3,6 (118). A suitable display is provided for any of the above steps.

If link was found on both sides at block 100, then the instrument enters inline mode (block 104). Whether in single ended mode or inline mode, frame parsing then begins in block 106, to analyze frames that may be received at either side of the device.

Figure 10:
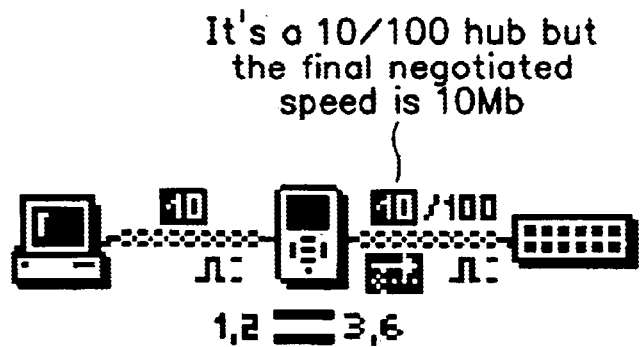
FIG. 10 is a representative display when negotiated and advertised conditions may differ.

When the advertised speed and duplex state are determined as noted above, the instrument will later advertise itself as a 10/100 Mbit full duplex device, thereby achieving the "highest level" of service available. A display is generated, with the negotiated values shown in inverse video (FIG. 10).

Figure 12:
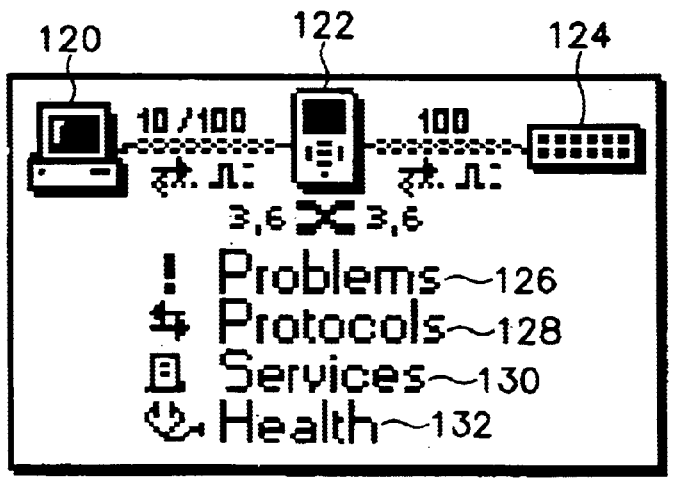
FIG. 12 is a representative display when the instrument operates in an inline mode.

A suitable display is in FIG. 12 for the inline mode. In FIG. 12, icon 120 represents a PC. The PC is running a 10/100 line, half duplex, normal link polarity and level. Link is on pair 3,6, crossed over through the instrument (icon 122). The network (represented by icon 124) is a 100 Mbit configuration, half duplex normal link level and polarity. Other icons displayed are Problems 126, Protocols 128, Services 130 and Health 132. Highlighting any of icons 120, 122, 124, 126, 128, 130 and 132 and selecting, via operation of navigation keys 18 and select key 16, will provide further information about the particular item. Selecting the PC icon 120 will display information regarding the PC configuration and the network resources being used by the PC. Selection of icon 122 will enter a setup mode, to allow instrument options to be configured. Icon 124 will provide network information, such as segment ID. Choosing Problems icon 126 will display the problem log of noted issues with levels 1–7 of the protocol layer. The protocols option 128 will list those protocols that have been observed from the PC or the network. Services option 130 will report the existence of various network services, e.g. routers, servers, printers, etc. Health 132 reports utilization, error and error types (FCS, short, jabber, etc.), and collisions, for example, for either side of the instrument. The health reports are typically given in number of frames per second and percentages.

In setup mode, various options may be configured, such as units for display of cable length (metric or English units), audible alarm, automatic power down after a period of time without use and contrast level. An "unwanted protocols" option may also be set, whereby the user may select from a list of protocols that are to be flagged as problems. Then, during operation of monitoring, if those selected protocols appear, a problem entry is logged. A still further option is a Windows advice selection, where verbose suggestions are added to the problem log to direct the user to specific configuration menus within the Windows operating system where the noted problem might be corrected.

Any of the reporting steps performed can selectively include logging of the report data, for later use or retrieval. The problem log provides a concise list of all "problems" detected. Example entries would include "Link on same pairs. Crossover inserted," to tell the user that the selective crossover was activated to correct the link wiring error. Another message would be "Bad FCS Frames (23) from desktop" indicating that 23 frames with bad frame check sequences were received from the desktop. Suitable icons are positioned adjacent the messages, indicating to the user the area of the problem. If Windows advice is selected in the setup, then a problem entry includes the particular Windows menu where the configuration relating to the problem will be found. For example, a problem entry reading "Unwanted WINS protocol from PC" would direct the user to look in the "Network—Config—TCP/IP, WINS" menu area of Windows.

While in figures herein representative of displays particular icons are shown, in use, the display will change graphically match the configuration, with the icon at the left or right side of the instrument illustrating the type of service or type of device to which it is connected. The interconnection therebetween provides a representation of the actual link through the test instrument, giving a pictorial view to the user.

An advantage provided by the instrument in accordance with the present invention is that since the instrument is (in a typical use) inline between two devices (suitably a PC and a network to which the PC is connected), the instrument is able to observe both sides of the conversation between the network and the PC. Therefore, the device is able to provide advice to a user via an expert system, to assist in debugging the connection. Such expert system advice may include reporting that the wrong type of service is connected, that the PC is misconfigured relative to the service to which it is connected, etc. Specific Windows configuration menus are referred to in a Windows network mode, so that the user knows where to go within configuration menus on the PC side, to correct any mis-configured options.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A test instrument for testing a network, comprising:
   first and second connectors for connecting the instrument inline between a first network device and a second network device; and
   a crossover switch for selectively correcting cable wiring errors.

2. A test instrument according to claim 1 further comprising:
   first and second receivers for receiving data from said first and second connectors for observing data sent from the first and second network devices.

3. A test instrument according to claim 1 further comprising:

a display for displaying graphical information relating to said first and second connectors, wherein said display is substantially aligned with said first and second connectors for providing a graphical display simulating a connection between said first and second connectors.

4. A test instrument according to claim 3, wherein said graphical display includes graphical representations of connected devices.

5. A test instrument for testing communication cables, comprising:

a first connector for receiving a first cable connection therein;

a second connector for receive a second cable connection therein; and a display for displaying graphical information relating to said first and second cable connections, wherein said display is substantially aligned with said first and second connectors for providing a display simulating a connection between said first and second connectors.

6. A test instrument for testing cable and network connections thereto, comprising:

first and second connectors adapted to receive a connection thereto; and a processor for determining what type of service from a plurality of service types if any is connected to either of said first and second connectors.

7. A test instrument for testing cable and network connections thereto according to claim 6, wherein said processor makes a determination of service types selected from the group comprising:

whether no connection is present;

whether a looped cable is connected between said first and second connectors;

whether a telephone service is connected;

whether a token ring is connected;

whether an Ethernet is connected;

whether an unterminated cable is connected;

whether an external wire map is connected; and whether an external device is connected.

8. A test instrument adapted for inline placement between two network connections comprising:

first and second receivers for receiving data from said two network connections; and an expert system for analyzing said network connections and providing information to a user regarding communication on the network.

9. A test instrument according to claim 8 wherein said information comprises information regarding problems.

10. A test instrument according to claim 8 wherein said information comprises information regarding protocols.

11. A test instrument according to claim 8 wherein said information comprises information regarding servers.

12. A test instrument according to claim 8 wherein said information comprises information regarding health.

13. A test instrument according to claim 8 wherein said information comprises information regarding link configuration.

14. A test instrument according to claim 8 wherein said information comprises information that a wrong type of service is connected.

15. A test instrument according to claim 8 wherein said information comprises information that a device is misconfigured relative to a service to which it is connected.

16. A test instrument according to claim 8 wherein one of said two network connections relates to a computer and said information comprises information referring to an operating system configuration menu appropriate to enable correction of a misconfigured option on said computer.

17. A test instrument according to claim 8 wherein said information is presented as graphical information display simulating a connection between said two network connections.

* * * * *